United States Patent Office 3,293,128
Patented Dec. 20, 1966

3,293,128
ANTHELMINTIC HYGROMYCIN B DERIVATIVES AND PROCESS OF USING SAME
Robert L. Mann, Indianapolis, Ind., assignor to Eli Lilly and Company, Indianapolis, Ind., a corporation of Indiana
No Drawing. Filed Nov. 24, 1961, Ser. No. 154,890
7 Claims. (Cl. 167—65)

This invention relates to new therapeutic agents useful for the treatment of parasitic infections and to processes for treating such infections. More particularly, this invention relates to $N^1$-substituted derivatives of hygromycin B and the acid addition salts thereof, their preparation, and their use in the treatment of helminthiasis.

Helminthiasis is one of the most serious and widely prevalent problems in the raising of farm animals. The economic losses brought about by parasitic infections of animals grown commercially are staggering. These losses occur not only as the result of extremely severe parasitic infections which cause death of the animals, but also as the result of insidious infections which by their debilitating effects reduce feed efficiency and carcass quality and increase the susceptibility of the animals to other disease conditions. The problem is likewise serious in the case of house pets where the general health of the animal is frequently impaired by a parasitic infection.

One of the most effective therapeutic agents currently in use for the treatment of helminthiasis in animals is hygromycin B, an antibiotic discovered by McGuire and Mann and described in United States patent application Serial No. 690,399, filed October 15, 1957, now U.S. Patent No. 3,018,220. It has the structure represented by the formula

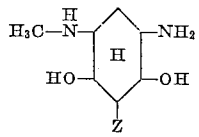

wherein Z is a sugar moiety whose structure has not yet been completely elucidated, and wherein the nitrogen atoms are conveniently distinguished as $N^1$ in the primary amino group and $N^2$ in the secondary amino group.

Hygromycin B has been utilized extensively as such in the treatment of farm animals, especially swine and poultry. When it is employed over a prolonged period of time, however, it occasionally produces an impairment of hearing in some animals, particularly swine, which appear to be especially susceptible. Although the problem occurs only infrequently when the hygromycin B is fed at the recommended dosages for the recommended time, it does discourage the use of the antibiotic in a continuous feeding program. Thus, a substance which would retain the highly desirable anthelmintic properties of hygromycin B and at the same time have reduced toxicity would be a valuable addition in the field of anthelmintic therapy.

It is an object of this invention to provide new anthelmintic substances of low toxicity having a high order of efficacy. A further object is to provide a process for the preparation of such substances. Still another object of this invention is to provide methods for the treatment of helminthiasis in animals. Other objects will become apparent from the specification and claims which follow.

The compounds of the present invention are $N^1$-substituted hygromycin B derivatives represented by the formula

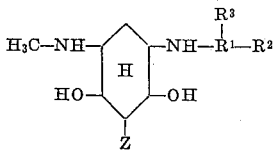

and the salts thereof formed with pharmaceutically acceptable acids, wherein Z again represents the sugar moiety of hygromycin B; $R^1$ is a saturated or olefinic aliphatic hydrocarbon connecting group containing from 1 to 12 carbon atoms; $R^2$ is hydrogen, hydroxy, lower alkoxy, or di(lower)alkylamino; and $R^3$ is hydrogen, aryl, or heterocyclic containing O, S, and/or N; wherein the aryl group can be additionally substituted by amino, hydroxy, lower alkoxy, di(lower)alkylamino, halogen, or methylenedioxy; and wherein the heterocyclic group can be additionally substituted by amino, lower alkyl, lower alkoxy, di(lower)alkylamino or halogen.

Among the examples of aryl groups defined by $R^3$ are phenyl, hydroxyphenyl, methoxyphenyl, dimethylaminophenyl, chlorophenyl, bromophenyl, fluorophenyl, salicyl, vanillyl, dichlorophenyl, dimethoxyphenyl, naphthyl, and the like.

$R^3$, when it defines a heterocyclic group, can be carbazolyl, dioxanyl, furyl, imidazolyl, indolyl, isoindolyl, isoquinolyl, isoxazolyl, oxazolyl, pyrazinyl, pyrazolyl, pyridyl, pyrimidyl, pyrryl, quinazolyl, quinolyl, quinoxalyl, thiazolyl, thienyl, triazolyl, and the like; the partially and completely hydrogenated derivatives thereof; the derivatives thereof having alkoxy, alkyl, amino, dialkylamino, halogen, or hydroxy substituted at one or more positions on the ring, as for example, the picolyls, methylfuryls, methylthienyls, bromopyridyls, and the like; and heterocyclic radicals having a fused benzo ring, such as benzodioxanyl, benzofuryl, benzothienyl, and the like.

In accordance with the invention, $N^1$-substituted derivatives of hygromycin B having a high degree of anthelmintic efficacy are prepared by allowing an aldehyde to react with hygromycin B to form an intermediate of the Schiff's base type, and reducing the intermediate by a suitable catalytic or chemical means. It is not necessary to isolate the intermediate Schiff's base prior to reduction, although this may be done if desired. Reduction of the intermediate can be effected catalytically at temperatures of from about 20 to about 100° C. and hydrogen pressures of about 30 to about 1500 p.s.i. with catalysts such as platinum oxide, 5% palladium on carbon, 5% palladium on alumina, 5% rhodium on carbon, and the like. Alternatively, the reduction can be carried out with sodium borohydride in aqueous or alcoholic solutions. Numerous alternative reduction techniques will be readily apparent to those skilled in the art. Aldehydes used in this process can be aliphatic, aromatic, or heterocyclic and are limited only by their availability. Illustrative of the aldehydes which can be used are acetaldehyde, crotonaldehyde, glycolaldehyde, undecylenic aldehyde, 4-acetaminobenzaldehyde, 2-chlorobenzaldehyde, 3-methoxybenzaldehyde, 4-nitrobenzaldehyde, 3,4,5-trimethoxybenzaldehyde, veratraldehyde, 2-naphthaldehyde, furfural, 2-thiophenecarboxaldehyde, and the like, and in general virtually any aliphatic, aromatic, or heterocyclic aldehyde.

The N'-substituted hygromycin B derivatives and their physiologically acceptable salts are employed for the control of helminthiasis by administering to a parasitized host an effective amount of the drug, usually between about 100 mg. per kg. and 1000 mg. per kg. of host body weight, preferably between about 250 mg. per kg. and 750 mg. per kg. The selected derivative can be supplied in any of a variety of dosage forms which may include the drug alone or in combination with a pharmaceutical excipient such as a solid or liquid diluent, buffer, binder, coating material, preservative, emulsifier, or the like. The solid dosage forms are especially convenient to administer and may in one embodiment of the invention consist of the selected compound incorporated in a physiologically compatible excipient, for example an edible feedstuff, in such proportion as to provide the drug in high concentration, in which orm it may be added to or mixed with the animal's feed in the proper dosage amount. The dose required for the animal can be blended with a portion or all of the feed consumed by the animal during a day or other time interval. The term "edible feedstuff" as used in this disclosure may refer to a normal dietary constituent of the animal, such as a complete ration, or a component or combination of components of the complete ration, or a mineral or vitamin supplement or the like, and in general any dietary component which is physiologically utilizable by the animal. Alternatively, the excipient can be any bland, non-irritating material which will be accepted by the animal, but which itself is not physiologically utilizable, as for example an ion exchange resin or the like.

Other solid dosage forms such as tablets and/or filled capsules comprising the anthelmintic agent and one or more of the commonly used diluents such as talc, lactose, starch, magnesium stearate, methylcellulose, and the like can be employed with equally good results.

For the treatment of helminthiasis in farm animals, the compounds of this invention are conveniently administered by incorporating them with the normal feed consumed by the animals. The concentration of the anthelmintic agent in the feed can vary from about 5 g. per ton to about 50 g. per ton, being preferably about 25 g. per ton. The animals are permitted to consume the medicated feed for varying periods of time, depending upon the effect desired. Thus, animals which are heavily parasitized can be treated for a short time with a feed containing a relatively high proportion of the drug, for example 35 to 40 g. per ton of feed, until the existing parasite burden is eliminated or satisfactorily reduced. Thereafter, the animals can be fed coninuously a ration having a lower drug concentration, as for example 10 to 15 g. per ton of feed, in order to maintain them in a deparasitized condition. Other variations in drug concentrations and treatment schedules will be apparent to those skilled in the art. The relatively low toxicity of the $N^1$-substituted hygromycin B derivatives makes possible their use in a prolonged feeding program without serious side effects. This lack of toxicity has been demonstrated in the case of $N^1$-benzylhygromycin B by feeding the drug in concentrations as high as 240 g. per ton for as long as 16 weeks without any adverse effect on growth or feed efficiency and with no apparent impairment of hearing.

The compounds of the present invention are stable, white or nearly white, amorphous solids of indefinite melting point. Their infrared absorption spectra are, in general, not sufficient distinguished from the spectrum of hygromycin B to serve to characterize the compounds. Ultraviolet absorption spectra are of value only in the case of those compounds derived from aldehydes having aromatic character. These, of course, exhibit the absorption characteristics of the aromatic nucleus. The compounds are characterized primarily by microbiological assay methods, bioautograph, and thin-layer chromatography. The intermediate Schiff's bases show the expected —C=N— absorption in both the infrared and ultraviolet regions. This is most useful as a means for following the progress of the reduction of the Schiff's bases, since the intensity of absorption diminishes as the saturation of the —C=N— bond proceeds.

The general procedures used in the preparation of the compounds of this invention and some of the methods of utilizing them in the treatment of helminthiasis are illustrated in the examples which follow. The invention, however, is not to be construed as being limited to these methods, either preparative or therapeutic, inasmuch as other variations will be apparent to those skilled in the art.

*Example 1*

To a suspension of 4 g. of hygromycin B in 15 ml. of absolute ethanol there were added about 1.6 molar equivalents of furfural. The mixture was shaken occasionally until essentially all of the material was in solution, and was then filtered into 100 ml. of ether. The intermediate precipitated thereby was removed by filtration, washed with ether, and air dried. The dry intermediate was dissolved in 30 ml. of methanol and cooled in an ice bath while a solution of 800 mg. of sodium borohydride in 15 ml. of cold methanol was added. The reaction mixture was kept in the ice bath until gas evolution had almost ceased and was then allowed to warm to room temperature. After being heated for one hour at 50° C. on a water bath, the solution was filtered into 300 ml. of ether. The precipitated $N^1$-furfurylhygromycin B was removed by filtration, washed with ether, and air dried.

*Example 2*

The procedure of Example 1 was followed in detail except that the addition of the sodium borohydride solution was made directly to the solution of the Schiff's base without preliminary isolation of the intermediate. The product was identical to that obtained in the previous example.

*Example 3*

To a solution of 4 g. of hygromycin B in 20 ml. of water there were added 1.6 ml. of benzaldehyde. The reaction mixture was shaken frequently for 2½ hours, after which it was cooled in an ice bath while 800 mg. of solid sodium borohydride were added with care. The mixture was allowed to warm to room temperature and kept without additional heating for another hour. The reaction mixture was filtered into acetone and the precipitated $N^1$-benzylhygromycin B was removed by filtration, washed with acetone and ether, and air dried.

*Example 4*

Except for solvent composition, the procedure of Example 3 was followed in detail. The effect of varying the composition of the solvent used to dissolve the hygromycin B was determined. Methanol-water ratios of 9:1, 4:1, 7:3, 3:2, 2:3 and 1:9 were employed without apparent effect on the course of the reaction.

*Example 5*

A mixture of 4 g. of hygromycin B, 15 ml. of ethanol and 2 ml. of benzaldehyde was stirred at room temperature until complete solution occurred. Sufficient ethanol was added to give a total volume of 150 ml. After addition of 2 g. of 5% palladium on carbon, the mixture was shaken under a hydrogen pressure of 500 p.s.i. for eight hours at 50° C. After removal of the catalyst by filtration, the filtrate was concentrated to a small volume and poured into ether. The precipitated $N^1$-benzylhygromycin B was filtered, washed with ether, and air dried. The product was identical to that obtained by the methods described in the previous examples.

*Example 6*

The general procedure of Example 5 was followed using platinum oxide as a catalyst under an initial hydrogen pressure of 41 p.s.i. The reduction took place at ambient temperature during twenty hours. The $N^1$-benzylhygromycin B obtained in this way was indistinguishable from that obtained by the other described methods.

*Example 7*

Groups of pigs, from two to six pigs per group, were segregated from a larger group previously determined by examination of fecal samples to be naturally parasitized. Starting weights varied from about 30 to about 100 pounds. The pigs were kept in individual Ranger cages during the experiment, which lasted thirty-five days. Each group was fed a conventional basal swine ration into which either $N^1$-furfurylhygromycin B or $N^1$-heptylhygromycin B was incorporated at concentrations ranging from about 24 g. per ton to about 48 g. per ton. A group of pigs receiving the basal ration without drug served as a control in each case. All parasites passed during the treatment period were counted daily. At the end of the experiment the animals were sacrificed and the unexpelled worms were counted. The sum of the passed worms and the remaining worms constituted the total worm burden for each animal. The results with $N^1$-furfurylhygromycin B are shown in Table I, those with $N^1$-heptylhygromycin B in Table II.

TABLE I.—ANTHELMINTIC EFFICACY IN SWINE OF $N^1$-FURFURYLHYGROMYCIN B

| Drug Concentration | No. of Pigs | Worms Eliminated [1] | |
| --- | --- | --- | --- |
| | | Ascaris suum, percent | Oesophagostumum spp., percent |
| Control | 5 | 48 | 2 |
| 24 g./ton | 6 | 71 | 75 |
| 30 g./ton | 4 | 48 | 69 |
| 36 g./ton | 2 | 98 | 91 |
| 48 g./ton | 2 | 100 | 100 |

[1] Percent Worms Eliminated = worms passed/total worms × 100%.

TABLE II.—ANTHELMINTIC EFFICACY IN SWINE OF $N^1$-HEPTYLHYGROMYCIN B

| Drug Concentration | No. of Pigs | Worms Eliminated [1] | |
| --- | --- | --- | --- |
| | | Ascaris suum, percent | Oesophagostumum spp., percent |
| Control | 3 | 55 | 3 |
| 24 g./ton | 2 | 98 | 19 |
| 36 g./ton | 2 | 90 | 30 |
| 48 g./ton | 2 | 95 | 50 |

[1] As in Table I.

Example 8

The procedure of Example 7 was followed in detail with $N^1$-benzylhygromycin B except that the treatment period was fifty-six days. The results are given in Table III.

TABLE III.—ANTHELMINTIC EFFICACY IN SWINE OF $N^1$-BENZYLHYGROMYCIN B

| Drug Concentration | No. of Pigs | Worms Eliminated [1] | | |
| --- | --- | --- | --- | --- |
| | | Ascaris suum, percent | Oesophagostumum spp., percent | Trichuris suis, percent |
| Control | 4 | 32 | 16 | 37 |
| 12 g./ton | 4 | 23 | 85 | 45 |
| 18 g./ton | 4 | 56 | 88 | 94 |
| 24 g./ton | 4 | 14 | 100 | 57 |
| 30 g./ton | 4 | 88 | 97 | 59 |
| 36 g./ton | 4 | 95 | 98 | 64 |

[1] As in Table I.

Example 9

The general procedure of the previous examples was followed using combinations of hygromycin B and $N^1$-benzylhygromycin B. The treatment period was fifty-six days. The results are presented in Table IV. All treated groups received 6 g. per ton of hygromycin B and the indicated amount of $N^1$-benzylhygromycin B.

TABLE IV.—ANTHELMINTIC EFFICACY IN SWINE OF MIXTURES OF HYGROMYCIN B AND $N^1$-BENZYLHYDROMYCIN B

| Concentration of $N^1$-Benzyl-hygromycin B | No. of Pigs | Worms Eliminated [1] | | |
| --- | --- | --- | --- | --- |
| | | Ascaris suum, percent | Oesophagostumum spp., percent | Trichuris suis, percent |
| Control | 6 | 41 | 3 | 27 |
| 6 g./ton | 6 | 100 | 95+ | 99+ |
| 8 g./ton | 6 | 100 | 99+ | 95+ |
| 10 g./ton | 6 | 100 | 99 | 100 |

[1] As in Table I.

Example 10

Evaluation of the compounds for anthelmintic activity was also carried out in mice against the mouse pinworm *Syphacia obvelata*, a species generally considered by those

TABLE V.—ANTHELMINTIC EFFICACY AND TOXICITY OF HYGROMYCIN B DERIVATIVES

| Aldehyde from which derived | Dose of Drug,[1] mg./kg. | Clearance,[2] percent | Worm Reduction,[3] percent | Approximate $LD_{50}$,[4] mg./kg. |
| --- | --- | --- | --- | --- |
| Crotonaldehyde | 326 | 75 | 99 | 400 |
| 2-hydroxybutyraldehyde | 381 | 88 | 99 | 500 |
| Caprylaldehyde | 433 | | 80 | 500 |
| n-Heptaldehyde | 730 | 100 | 100 | |
| | 307 | 75 | 99 | 200 |
| | 184 | | 90 | |
| n-Decylaldehyde | 507 | 57 | 80 | |
| Laurylaldehyde | 788 | | 99 | |
| | 252 | | | <500 |
| Hydroxycitronellal | 443 | 63 | 99 | 200 |
| Tiglic aldehyde | 442 | 50 | 99 | 170 |
| 3-dimethylaminopivalaldehyde | 288 | 0 | 98 | 450 |
| Benzaldehyde | 226 | 75 | 99 | 500 |
| | 134 | | 97 | |
| p-Fluorobenzaldehyde | 407 | 63 | 99 | 200 |
| p-Dimethylaminobenzaldehyde | 657 | 86 | 94 | |
| | 418 | 50 | 94 | |
| Salicylaldehyde | 402 | 75 | 99 | 400 |
| Vanillin | 414 | 75 | 99 | 500 |
| Piperonal | 391 | 100 | 100 | 600 |
| α-Methylcinnamaldehyde | 232 | 0 | 99 | 200 |
| Furfural | 317 | 100 | 100 | 450 |
| | 210 | 75 | 99 | |
| 6-methyl-2-pyridylaldehyde | 318 | 100 | 100 | 250 |
| Indole-3-carboxaldehyde | 288 | 100 | 100 | 175 |

[1] Average calculated drug intake per mouse. This may exceed $LD_{50}$ because taken in small quantities during a week.
[2] Percent Clearance = Number of mice completely free of worms/Number of mice on test × 100%.
[3] Percent Reduction = Ave. No. Mice per control animal less ave. No. mice per treated animal/Ave. No. mice per control animal × 100%.
[4] Acute toxicity determined orally in mice. Approx. $LD_{50}$ for hygromycin B = 75 mg./kg.

killed in the art to parallel the response of other helminth species, especially *Enterobius vermicularis*. Mice naturally infected with *Syphacia obvelata* were kept for one week on a diet into which was incorporated a given percentage by weight of the drug being tested. Similar groups of naturally infected mice were kept as untreated controls. At the end of one week, all mice were sacrificed and the parasites remaining were counted. Comparison of the worm burdens of the treated and control mice provided a measure of the worm reduction effected by the drug. The anthelmintic efficacy and oral toxicities for a representative group of compounds appear in Table V.

I claim:
1. The $N^1$-substituted hygromycin B derivatives having the formula

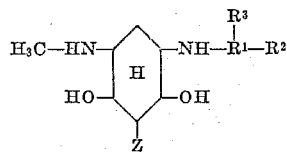

and the salts thereof with pharmaceutically acceptable acids, wherein:
   Z represents the sugar moiety of hygromycin B;
   $R^1$ is a saturated or olefinic $C_1$–$C_{12}$ aliphatic hydrocarbon connecting group;
   $R^2$ is hydrogen, hydroxy, lower alkoxy or di (lower) alkylamino; and
   $R^3$ is hydrogen; phenyl; naphthyl; phenyl having at least one substituent, the substituents being amino, hydroxy, lower alkoxy, di(lower)alkyamino, halogen, or methylenedioxy; or a heterocyclic group containing at least one hetero atom of the group consisting of O, S, and N.
2. $N^1$-benzylhygromycin B.
3. $N^1$-furfurylhygromycin B.
4. $N^1$-heptylhygromycin B.
5. The process of treating helminthiasis in animals which comprises orally administering to the host animal a therapeutic quantity of the compound of claim 1.
6. The process of treating helminthiasis in animals which comprises feeding to an infected animal a medicated feed containing as an active ingredient thereof the compound of claim 1, said active ingredient being present in the feed in a concentration of between about 5 g. per ton and about 50 g. per ton.
7. The process of treating helminthiasis in animals which comprises feeding to a helminth infected animal a medicated feed containing hygromycin B in a concentration between about 3 g. per ton and about 8 g. per ton of feed and the composition of claim 1 in a concentration of between about 5 g. per ton and about 20 g. per ton.

References Cited by the Examiner
UNITED STATES PATENTS
3,018,220   1/1962   McGuire _____ 167—53

OTHER REFERENCES
Fieser and Fieser: Organic Chemistry, 2nd ed. (1950), p. 638.

JULIAN S. LEVITT, *Primary Examiner.*
SAM ROSEN, *Assistant Examiner.*